Figure 3:
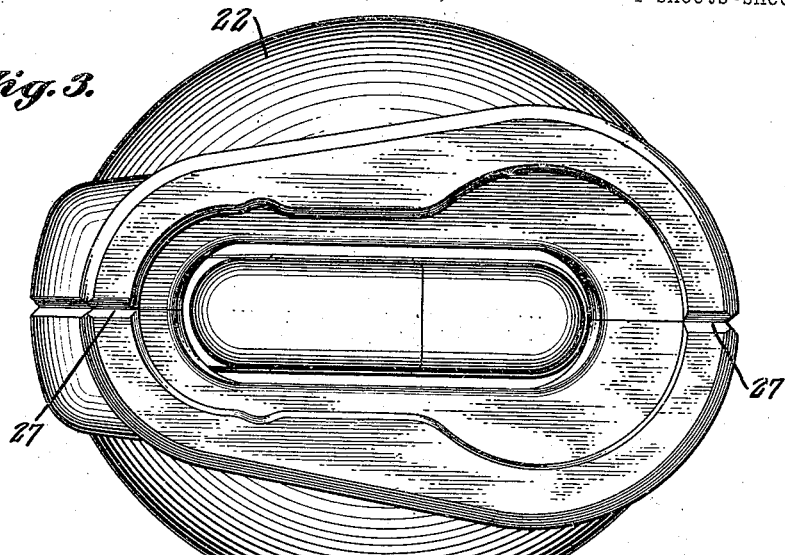

Mar. 6, 1923.　　　　　　　　　　　　　　　　1,447,529
G. W. BOWERS
CLOSET MOLD AND PROCESS OF MOLDING
Filed Sept. 10, 1920　　　　4 sheets-sheet 1
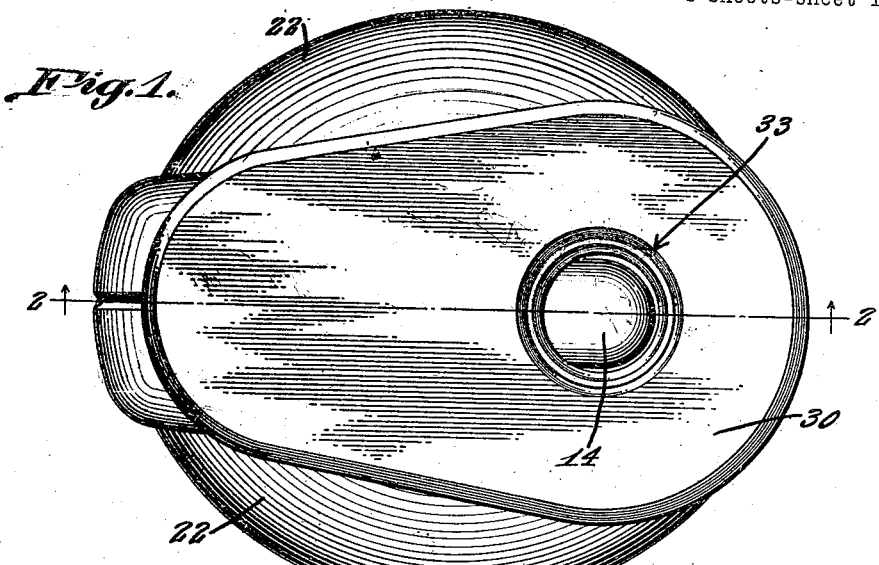
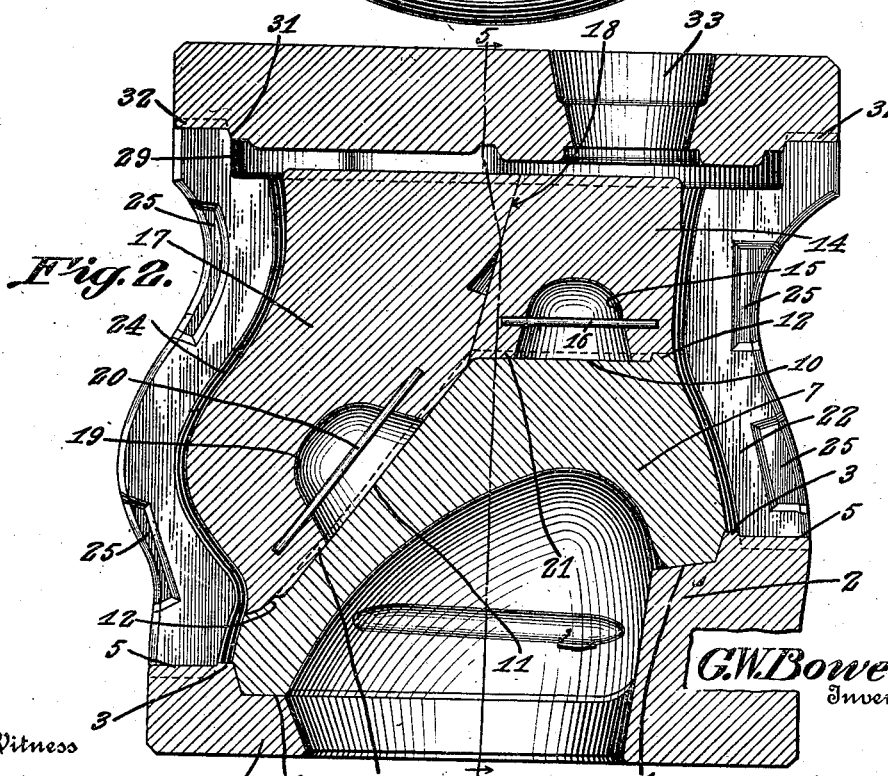
G. W. Bowers, Inventor Mar. 6, 1923.

G. W. BOWERS 1,447,529

CLOSET MOLD AND PROCESS OF MOLDING

Filed Sept. 10, 1920  4 sheets-sheet 2

G. W. Bowers,
Inventor

Witness

By C. A. Snow & Co.
Attorneys

Mar. 6, 1923.                                                              1,447,529
G. W. BOWERS
CLOSET MOLD AND PROCESS OF MOLDING
Filed Sept. 10, 1920.                        4 sheets-sheet 3
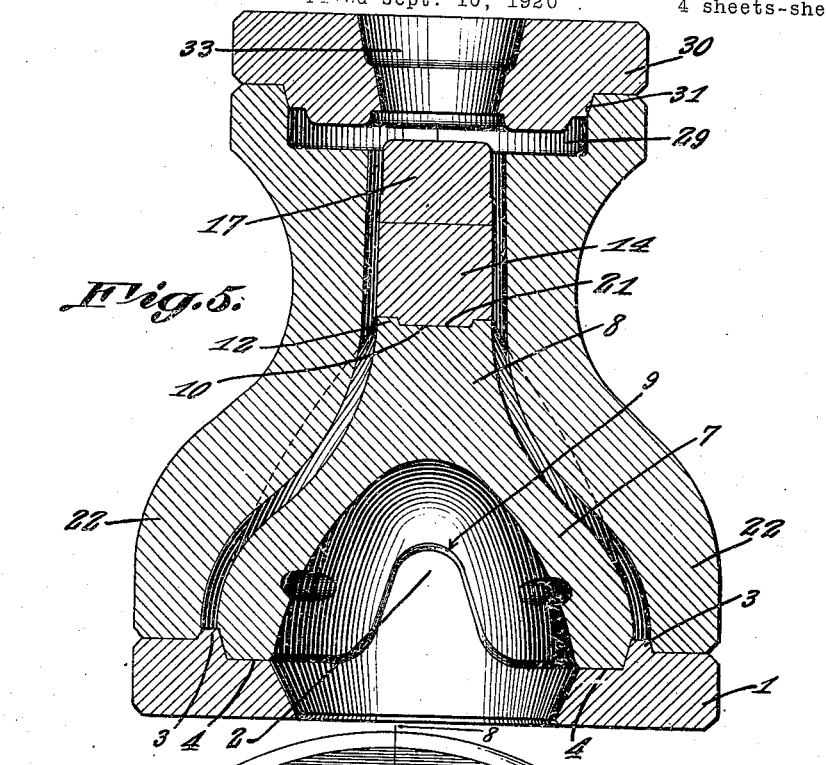
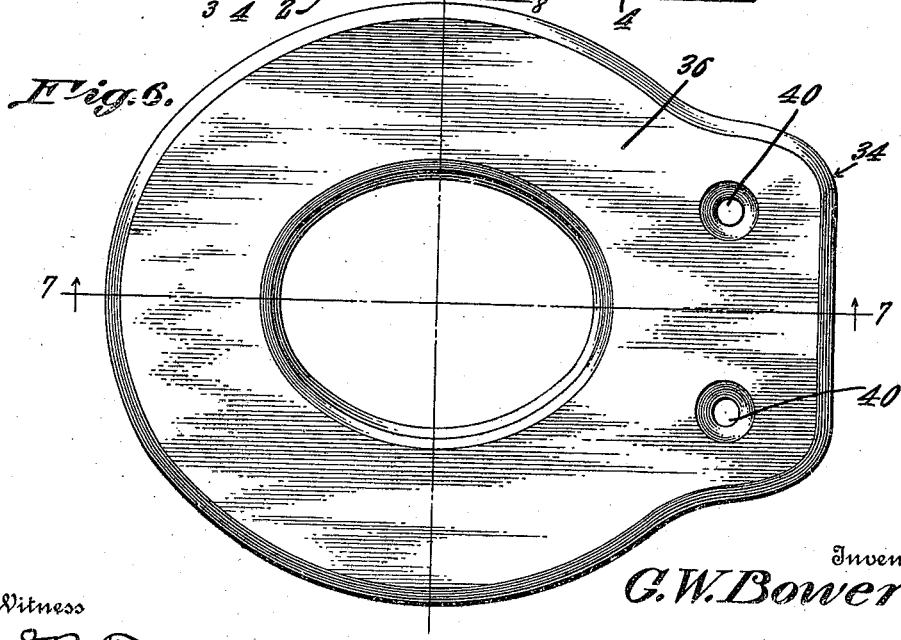
Witness
Inventor
G. W. Bowers,
By C. A. Snow & Co.
Attorney

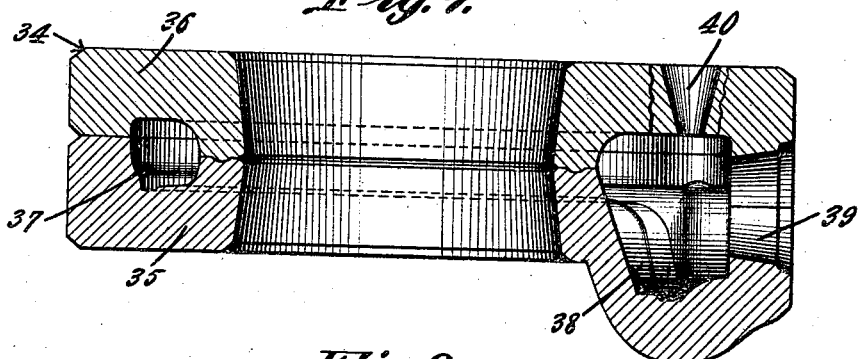
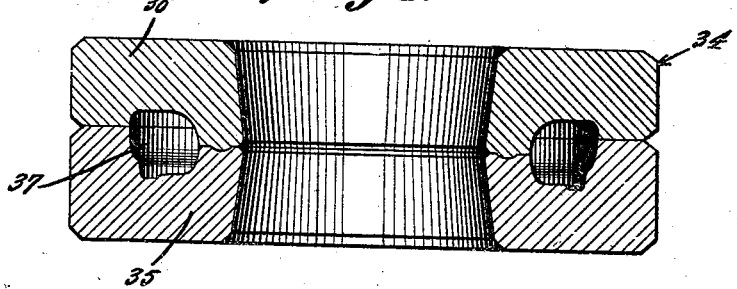
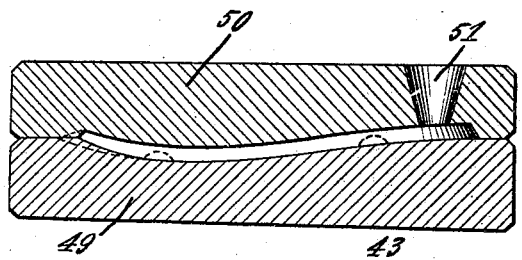
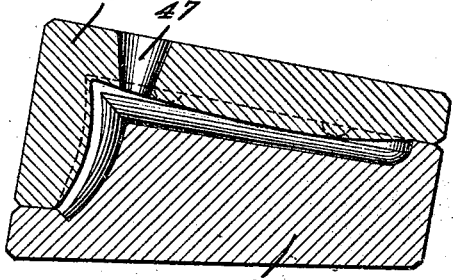
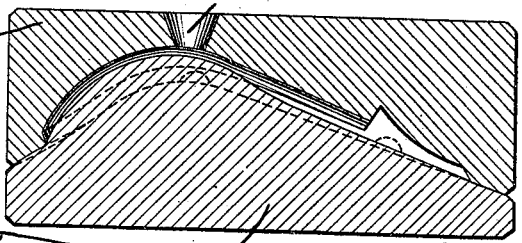

Patented Mar. 6, 1923.

1,447,529

UNITED STATES PATENT OFFICE.

GEORGE W. BOWERS, OF MANNINGTON, WEST VIRGINIA.

CLOSET MOLD AND PROCESS OF MOLDING.

Application filed September 10, 1920. Serial No. 409,346.

*To all whom it may concern:*

Be it known that I, GEORGE W. BOWERS, a citizen of the United States, residing at Mannington, in the county of Marion and State of West Virginia, have invented a new and useful Closet Mold and Process of Molding, of which the following is a specification.

In order that the objects of this invention may be understood clearly, it is necessary to refer briefly to the general state of the prior art. The patent to S. L. Barnes, 1,109,313, dated September 1, 1914 discloses a means for fashioning a water closet bowl by casting. The slip is drawn from the bottom of the mold by removing plugs, thereby leaving holes in the spoon, which must be stopped up. The foot of the closet is made separately and not by a casting process. There is no internal core, and, as a consequence, the inner and outer surfaces of the bowl are not subjected to the absorbent action of the mold. Patent No. 1,183,067, issued on the 16th day of May, 1916, to S. C. Hill, discloses a means whereby a water closet bowl is fashioned by pouring, a double cast being effected, that is, both surfaces of the bowl are subjected to the absorbent action of the mold. In this patent, however, laterally removable parts are provided for the formation of the siphon, and these parts, when removed, leave holes in the front of the bowl, and the holes must be closed by a slab, fashioned as an article distinct from the bowl, and inserted as a step separate from the making of the bowl.

The aforesaid patents, I believe, give a fair survey of the prior art, and, so far as I am advised, no one hitherto has proposed a step in the making of a water closet, which consists in fashioning a circumferentially continuous bowl and a foot simultaneously and integrally by pouring the slip between an exterior body and an interior core which are spaced from each other by a distance equal to the thickness of the wall of the finished product, the mold being inverted, if desired, to effect a draining of the surplus slip by way of the same opening through which the slip is introduced. The aforesaid features, together with others hereinafter alluded to, characterize this application, define its objects and point out its patentability.

Within the scope of what is claimed, a potter, exercising the skill of his craft, may depart from the specific disclosure, without departing in a corresponding degree from the spirit of the invention and without placing the utility of the invention in jeopardy.

In the accompanying drawings:—

Figure 4:
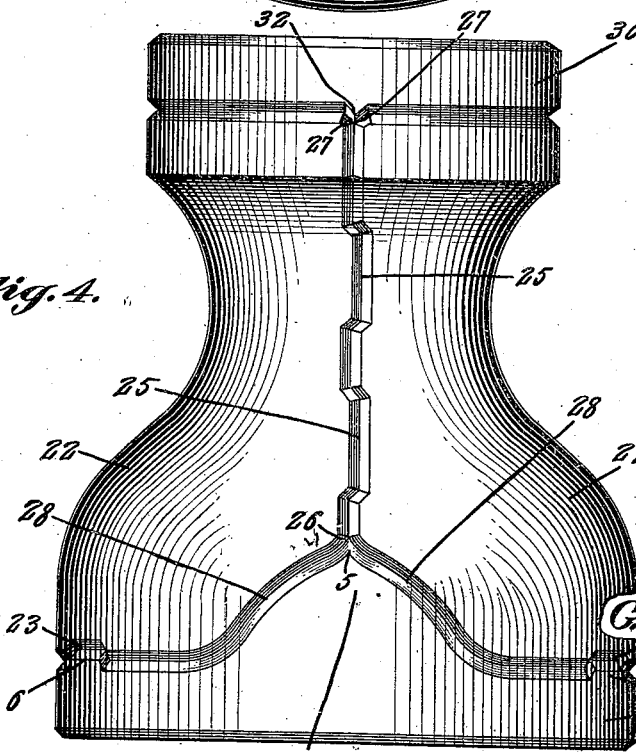

Figure 1 shows in top plan, a device constructed in accordance with the invention and capable of carrying out the process hereinafter described; Figure 2 is a vertical section taken approximately on the line 2—2 of Figure 1; Figure 3 is a top plan, wherein the cap has been removed; Figure 4 is an end elevation; Figure 5 is a transverse section taken approximately on the line 5—5 of Figure 2; Figure 6 is a top plan of the mold in which the ring is formed; Figure 7 is a section on the line 7—7 of Figure 6; Figure 8 is a section on the line 8—8 of Figure 6; Figure 9 is a section showing the mold wherein the closure slab is made; Figure 10 is a section showing the mold wherein the bottom of the bowl and spoon are fashioned; and Figure 11 is a section showing the mold wherein is produced the member which forms part of the outlet.

Referring to Figures 1, 2, 3, 4 and 5, there is shown a main mold including a base 1 in the form of a ring provided with an upstanding projection 2. On the upper surface of the base 1 there is a continuous upstanding rib 3 extended across the projection 2. Inwardly of the rib 3, the base 1 is depressed to form an annular seat 4. Transverse ribs 5, of inverted V-shape, are located on the upper surface of the base 1 and extend inwardly from the periphery thereof to the annular rib 3, the ribs 5 being rotated at the front and at the back of the base. The base 1 is supplied with upstanding lugs 6.

The numeral 7 denotes a bowl core, which, for the sake of lightness, may be cup-shaped, the bowl core including a thinned neck 8. The bowl core 7 rests on the seat 4 of the base 1 within the annular upstanding rib 3, the core 7 having in its lower edge a notch 9 (Figure 5) receiving the projection 2 of the base 1. Noting Figure 2, it will be observed that the neck 8 of the bowl core 7 is supplied with an upper surface 10 disposed parallel to the base 1 the neck having a downwardly inclined surface 11 defining an angle with the surface 10.

The upper end of the neck 8 is provided with a continuous marginal rib 12 bounding the surfaces 10 and 11.

A core block 14 is mounted on the surface 10 of the neck 8 and is provided with a cavity 15 wherein a handle 16 is located, to the end that the block may be manipulated conveniently. A core block 17 rests on the inclined surface 11, the abutting surfaces 18 of the blocks 17 and 14 being inclined with respect to the vertical, so that the core block 17 may be removed readily. The block 17 is provided with a cavity 19 wherein is located a handle 20. The blocks 14 and 17 have projecting portions 21 received within the marginal rib 12, so as to hold the core blocks in position against sliding movement.

A pair of side members 22 is provided, the side members being supported on the base 1. The side members 22 have notches 23 which receive the lugs 6 on the base 1. The inner surfaces of the side members 22 abut against the outer surface of the rib 3 on the base 1, as shown in Figure 5, the inner surfaces of the side members being separated from the outer surfaces of the bowl core 7, the neck 8 thereof, and the blocks 14 and 17, so that a space 24 exists, into which the slip may be poured. The side members 22 have vertical abutting edges provided with interengaged lugs and recesses which prevent relative movement between the side members. The side members 22 are beveled at the lower ends of their abutting edges, as shown at 26, to receive the transverse ribs 5 on the base 1. The members 22 are beveled, as indicated at 27, at the upper ends of their abutting edges, the said members being cut away, as indicated at 28 in Figure 4, to receive the projections 2 on the base 1. In the upper ends of the members 22 there exists a recess 29. See Figures 2 and 5.

A cap 30 is superposed on the upper ends of the side members 22 and has a depending projection 31 (Figure 5) extended part way down into the recess 29 of the side members 22, so that the cap cannot move laterally with respect to the side members. The cap 30 is provided with a depending V-shaped rib at its front and at its back (Figure 4), these ribs being received between the beveled portions 27 (Figure 3) of the side members 22. There is an opening 33 in the cap 30, through which the slip may be poured into the space 24 above alluded to.

From the foregoing, it will be obvious that the device described includes a mold comprising a body and a core in the body, the body and the core being spaced by a distance equal to the thickness of the wall of the finished product and represented by the space 24. Into this space the slip is poured, through the hole 33, the bowl and the foot of the closet being formed integrally and simultaneously, by casting, the recess 29 providing for the formation of the foot, a "double cast" being effected, since both surfaces of the product are subjected to the absorbent action of the mold. It is to be observed that not only are the bowl and the foot formed integrally and simultaneously by casting, but, as well, the bowl is circumferentially continuous, that is, there are no openings in the circumference of the bowl, which must be filled up with slabs or the like.

The closet is completed in a more or less conventional and common way. Thus, the rim is made in a mold 34, comprising a base 35 and a top 36, Figures 6, 7 and 8 being noted. The base and the top have coacting annular grooves 37, and there is an enlargement 38 in the members 35 and 36, wherein the inlet member for the rim is fashioned. Openings 40 are provided in the member 36, for the reception of pins (not shown), which form the holes for the attachment of the seat. The mold is set up edgewise, and the slip is poured in through an opening defined by cooperating notches 39 in the parts 35 and 36.

The spoon is made in a mold shown in Figure 11, the mold comprising a base 41 and a top 42, the top having a pouring aperture 43. The surplus slip may be poured out through the aperture 43, the opening 33 serving a like purpose in the structure shown in Figure 2.

The chair and the out and down leg of the siphon are formed in a mold shown in Figure 10 and including a base 45, and a top 46 having a pouring opening 47.

The closure is formed in the mold shown in Figure 9, the same comprising cooperating parts 49 and 50, the member 50 having a pouring opening 51.

I claim:—

1. In the process of making a water closet including a bowl and a base projecting laterally beyond the bowl, steps which comprise fashioning the bowl of circumferentially continuous form, and fashioning the bowl and the base integrally and in one uninterrupted operation, by pouring the slip between an absorbent external mold body and an absorbent internal mold core, which are spaced from each other by a distance equal to the thickness of the wall of the finished product, the base being subjected to the absorbent action of the mold at the point of juncture between the base and the bowl, and beyond the periphery of the bowl, the mold being inverted during the pouring of the slip, thereby permitting the slip to flow laterally and form the base, subsequent to the formation of the bowl, the mold being reversed to permit the surplus slip to drain through the same opening through which the slip is introduced during the casting operation.

2. A water closet mold comprising an annular base having an opening; a bowl core supported on the base and having a cavity coinciding with the opening in the base, the bowl core being provided with a substantially horizontal surface and with a slanting surface leading therefrom; a first core block mounted on the substantially horizontal surface of the bowl core; a second core block mounted on the slanting surface of the bowl core and extended upwardly along the first core block to the top thereof; laterally separable side members supported on the base and enclosing the bowl core and the core blocks; and a cap supported on the side members and having a pouring opening, the bowl core and the core blocks having interengaging elements serving to hold the core blocks in place on the bowl core.

In testimony that I claim the foregoing as my own, I have hereto affixed my signature in the presence of two witnesses.

GEORGE W. BOWERS.

Witnesses:
 B. GRANDON,
 A. SYBERT.